US009663241B1

(12) United States Patent
Kawalkar

(10) Patent No.: US 9,663,241 B1
(45) Date of Patent: May 30, 2017

(54) SPEED CHANGE AND ACCELERATION POINT ENHANCEMENT SYSTEM AND METHOD

(71) Applicant: HONEYWELL INTERNATIONAL INC., Morris Plains, NJ (US)

(72) Inventor: Amit Nishikant Kawalkar, Karnataka (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 15/132,873

(22) Filed: Apr. 19, 2016

(51) Int. Cl.
*B64D 43/02* (2006.01)
(52) U.S. Cl.
CPC .................... *B64D 43/02* (2013.01)
(58) Field of Classification Search
CPC ........................................................ B64D 43/02
See application file for complete search history.

(56) References Cited

U.S. PATENT DOCUMENTS

| 8,604,942 B2 | 12/2013 | Whitlow et al. |
| 9,196,166 B2 | 11/2015 | Horne et al. |
| 2009/0043434 A1* | 2/2009 | Deker ................. G05D 1/0676 701/16 |
| 2011/0238240 A1* | 9/2011 | Barral .................... G01C 23/00 701/14 |
| 2012/0150369 A1* | 6/2012 | Giovannini ............ G08G 5/025 701/18 |
| 2013/0204470 A1* | 8/2013 | Luckner ................ G08G 5/025 701/18 |
| 2014/0012436 A1* | 1/2014 | Coulmeau ............. G05D 1/101 701/3 |

OTHER PUBLICATIONS

Rockwell Collins; Head-Up Guidance System (HGS) for midsize and light business aircraft; HGS-3500 white paper; Apr. 2011.

* cited by examiner

Primary Examiner — Leon Flores
(74) Attorney, Agent, or Firm — Lorenz & Kopf, LLP

(57) ABSTRACT

A vehicle display system includes a display device and a processor. The processor is in operable communication with the display device and is coupled to receive vehicle path data and vehicle state data. The vehicle path data are representative of a planned vehicle path of the vehicle, and the vehicle state data are representative of current vehicle state. The processor is configured, upon receipt of these data, to command the display device to render at least a portion of the planned vehicle path and to selectively render one or both of a speed change point symbol and an acceleration point symbol on the current vehicle path. The symbols are rendered in a manner that is more intuitive for vehicle pilots.

20 Claims, 4 Drawing Sheets

SPEED CHANGE AND ACCELERATION POINT ENHANCEMENT SYSTEM AND METHOD

TECHNICAL FIELD

The present invention relates to a vehicle display system and, more particularly, to a system and method for enhanced display of speed change and deceleration and/or acceleration points on vehicle displays.

BACKGROUND

Currently, some aircraft manufacturers display symbols that indicate where a speed change and/or acceleration should occur. However, these symbols do not convey whether the speed change is a reduction in speed, an increase in speed, a negative acceleration (i.e., deceleration), or a positive acceleration. Thus, the current symbology only partially addresses speed behavior related situation awareness requirements, resulting in increased likely of human error.

The symbols used in current aircraft for speed change and acceleration can be difficult to differentiate and adapt to the situational awareness requirements of speed and acceleration behavior. It is preferable, therefore, to have unique and intuitive symbology that helps pilots build situation awareness regarding speed change trends, locations, and expected accelerations and decelerations. The present invention addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a vehicle display system includes a display device and a processor. The processor is in operable communication with the display device and is coupled to receive vehicle path data and vehicle state data. The vehicle path data are representative of a planned path of the vehicle, and the vehicle state data are representative of current vehicle state. The processor is configured, upon receipt of these data, to command the display device to render at least a portion of the planned vehicle path and to selectively render a speed change point symbol on the current vehicle path. The speed change point symbol comprises a travel direction symbol and a speed change symbol. The travel direction symbol comprises first and second lines that intersect at a first vertex. The first and second lines each have a first length, and the first vertex is rendered on the planned vehicle path. The speed change symbol is rendered adjacent the travel direction symbol and comprises third and fourth lines that intersect at a second vertex. The third and fourth lines each have a second length that is unequal to the first length, and the second vertex is rendered on the planned vehicle path.

In another embodiment, a vehicle display system includes a display device and a processor. The processor is in operable communication with the display device and is coupled to receive vehicle path data and vehicle state data. The vehicle path data are representative of a planned path of the vehicle, and the vehicle state data are representative of current vehicle state. The processor is configured, upon receipt of these data, to command the display device to render at least a portion of the planned vehicle path and to selectively render an acceleration point symbol on the current vehicle path. The acceleration point symbol comprises a travel direction symbol and an acceleration symbol. The travel direction symbol comprises first and second lines that intersect at a first vertex. The first and second lines each have a first length, and the first vertex is rendered on the planned vehicle path. The acceleration symbol is rendered on the planned vehicle path and comprises a line and an arrowhead. The line has a first end and a second end, the first end is rendered on the first vertex, and the arrowhead is rendered on the second end.

Furthermore, other desirable features and characteristics of the display system and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the appended drawing figures, wherein like numerals denote like elements, and wherein.

DETAILED DESCRIPTION

Figure 1:
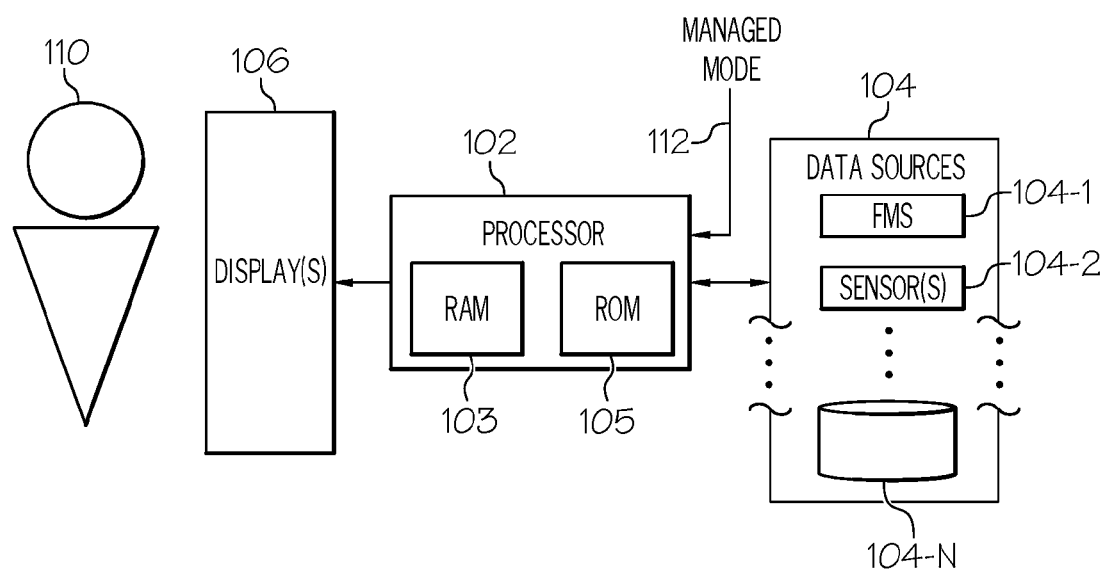
FIG. 1 is a functional block diagram of a vehicle display system according to one embodiment of the present invention.

The following detailed description is merely exemplary in nature and is not intended to limit the invention or the application and uses of the invention. Furthermore, there is no intention to be bound by any expressed or implied theory presented in the preceding technical field, background, brief summary or the following detailed description. In this regard, although an embodiment is described herein in the context of an aircraft, the system and method described herein may be implemented in numerous other vehicles, including automobiles, watercraft, and various other terrain, waterborne, and airborne vehicles.

The present invention may be described in terms of functional block diagrams and various processing steps. It should be appreciated that such functional blocks may be realized in many different forms of hardware, firmware, and/or software components configured to perform the various functions. For example, the present invention may employ various integrated circuit components, e.g., memory elements, digital signal processing elements, look-up tables, and the like, which may carry out a variety of functions under the control of one or more microprocessors or other control devices. Such general techniques are known to those skilled in the art and are not described in detail herein. Moreover, it should be understood that the exemplary process illustrated may include additional or fewer steps or may be performed in the context of a larger processing scheme. Furthermore, the various methods presented in the drawing Figures or the specification are not to be construed as limiting the order in which the individual processing steps may be performed. It should be appreciated that the particular implementations shown and described herein are illustrative of the invention and its best mode and are not intended to otherwise limit the scope of the invention in any way.

A functional block diagram of an exemplary vehicle display system 100 is depicted in FIG. 1, and includes a processor 102, a plurality of data sources 104 (e.g., 104-1, 104-2, 104-3 . . . 104-N), and a display device 106. The processor 102 is in operable communication with the data sources 104 and the display device 106. The processor 102 is coupled to receive various types of data from the data sources 104. It will be appreciated that the data may vary. In the depicted embodiment, however, the data includes at least vehicle plan data and vehicle inertial and navigation data. The processor 102 is configured, in response to at least these data, to render various images on the display device 106. It will be appreciated that other types of data may also be supplied to the processor 102.

The processor 102 may be any one (or a plurality) of numerous known general-purpose microprocessors or application specific processor(s) that operates in response to program instructions. In the depicted embodiment, the processor 102 includes on-board RAM (random access memory) 103, and on-board ROM (read only memory) 105. The program instructions that control the processor 102 may be stored in either or both the RAM 103 and the ROM 105. For example, the operating system software may be stored in the ROM 105, whereas various operating mode software routines and various operational parameters may be stored in the RAM 103. It will be appreciated that this is merely exemplary of one scheme for storing operating system software and software routines, and that various other storage schemes may be implemented. It will also be appreciated that the processor 102 may be implemented using various other circuits, not just a programmable processor. For example, digital logic circuits and analog signal processing circuits could also be used. In this respect, the processor 102 may include or cooperate with any number of software programs (e.g., avionics display programs) or instructions designed to carry out various methods, process tasks, calculations, and control/display functions described below. The processor 102 may also be part of, or incorporate portions of, one or more of the data sources 104.

The data sources 104 supply at least the above-mentioned data to the processor 102. The data sources 104 may include a wide variety of databases, devices, and systems, some or all of which may reside onboard the vehicle or at one or more remote locations. In the depicted embodiment, in which the vehicle is an aircraft, the data sources 104 include at least a flight management system (FMS) 104-1 that, as is generally known, is configured to supply flight path data representative of an aircraft flight plan. The data sources 104 additionally include one or more sensors 104-2 (e.g., gyroscopes, global positioning systems, inertial reference systems, avionics sensors, etc.) capable of determining the mode and/or position of the aircraft relative to one or more reference locations, points, planes, or navigation aids, as well as the current state of the aircraft. As used herein, "current state of the aircraft" includes at least the aircraft lateral position, aircraft altitude, aircraft lateral direction, aircraft vertical direction, aircraft lateral speed, and aircraft vertical speed.

The display device 106 is used to display various images and data, in a graphic, iconic, and/or a textual format, and to supply visual feedback to the user 110. It will be appreciated that the display device 106 may be implemented using any one of numerous known displays suitable for rendering graphic, iconic, and/or text data in a format viewable by the user 110. Non-limiting examples of such displays include various cathode ray tube (CRT) displays, and various flat panel displays, such as various types of LCD (liquid crystal display), TFT (thin film transistor) displays, and OLED (organic light emitting diode) displays. The display may additionally be based on a panel mounted display, a HUD projection, or any known technology. In an exemplary embodiment, display device 106 includes a panel display. It is further noted that the system 100 could be implemented with more than one display device 106. For example, the system 100 could be implemented with two or more display devices 106.

No matter the number or particular type of display that is used to implement the display device 106, it was noted above that the processor 102 is responsive to the various data it receives to render various images on the display device 106. The images that the processor 102 renders on the display device 106 will depend, at least in part, on the particular functional display being implemented. For example, the display device 106 may implement one or more of a multi-function display (MFD), a three-dimensional MFD, a primary flight display (PFD), a synthetic vision system (SVS) display, a vertical situation display (VSD), a horizontal situation indicator (HSI), a traffic awareness and avoidance system (TAAS) display, or a three-dimensional TAAS display, just to name a few. Moreover, the system 100 may be implemented with multiple display devices 106, each of which may implement one or more these different, non-limiting functional displays. The display device 106 may also be implemented in an electronic flight bag (EFB) and, in some instance, some or all of the system 100 may be implemented in an EFB.

Figure 2:
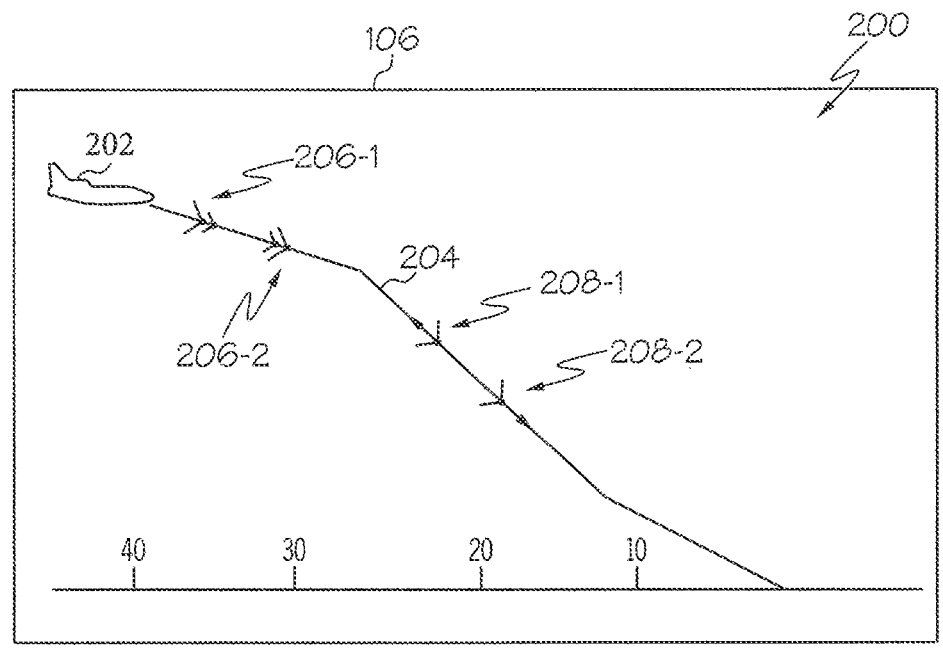
FIG. 2 is an exemplary representation of an image that may rendered on a display device in the system of FIG. 1.

Referring now to FIG. 2, an exemplary image that may be rendered on the display device 106 when it is implementing a VSD is depicted and will now be described. Before doing so, it is noted that the depicted VSD image 200 is merely exemplary of one embodiment, and that it could be variously implemented. It is additionally noted that various other images that are not depicted (or further described) could be rendered on the display device 106, if needed or desired.

The depicted VSD 200 includes a profile view aircraft symbol 202, a vertical flight path 204, two speed change point symbols 206 (206-1, 206-2), and two acceleration point symbols 208 (208-1, 208-2). The VSD 200 may additionally be rendered with various other features including, but not limited to, weather-related graphics, terrain features, and navigation aids, just to name a few. It is noted, however, that these and other additional features are, for clarity, not shown in FIG. 2. The aircraft symbol 202 is rendered at a position that is representative of aircraft altitude and distance to its destination.

The processor 102 is coupled to receive flight path data from, for example, the FMS 104-1, and aircraft state data from, for example, the one or more sensors 104-2. The flight path data are representative of a planned flight path of the aircraft, and the aircraft state data are representative of current aircraft state. The processor 102 is configured, upon receipt of these data, to command the display device 106 to render, in addition to the aircraft symbol 202, at least a portion of the planned flight path 204. The processor 102 is additionally configured, upon receipt of these data, to command the display device to 106 to selectively render one or both speed change point symbols 206 and/or one or both acceleration point symbols 208 on the current flight path 204.

Before proceeding further, it is noted that a speed change point indicates that a decreased or increased speed is required to be reached at the specified location in the flight path, and an acceleration point indicates that a decreased (deceleration) or an increased (acceleration) speed should begin at the specified location in the flight path in order to attain a desired speed state. The speed change point symbols 206 are depicted in FIGS. 3 and 4, and the acceleration point symbols 208 are depicted in FIGS. 5 and 6, and will each be described, beginning first with the speed change point symbols 206.

Figure 3:
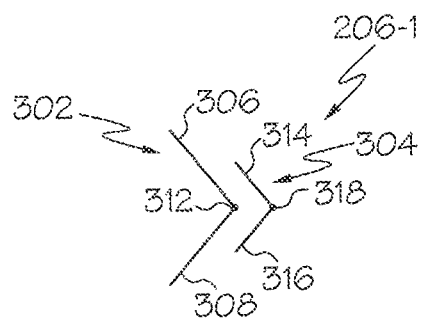
FIGS. 3-6 depict embodiments of specific symbology that may be rendered one the image depicted in FIG. 2.
Figure 4:
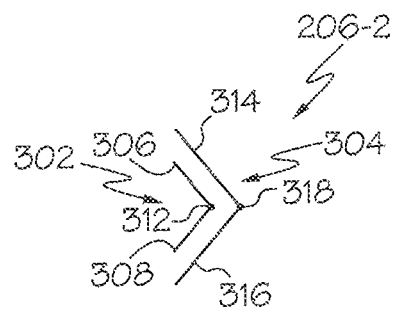

Referring to FIGS. 3 and 4, the speed change point symbols 206-1, 206-2 each comprise a travel direction symbol 302 and a speed change symbol 304. The travel direction symbol 302 comprises a first line 306 and a second line 308, each having a first length and intersecting at a first vertex 312. The speed change symbol 304 is rendered adjacent to the travel direction symbol 302 and comprises a third line 314 and a fourth line 316, each having a second length and intersecting at a second vertex 318.

As FIGS. 3 and 4 depict, the first and second lengths are unequal, and one of these lengths will be larger than the other depending upon whether the processor 102 determines that the aircraft will need to undergo a speed increase or a speed decrease. Specifically, if the aircraft will need to undergo a speed decrease, the processor 102 will command the display device 106 to render the travel direction symbol 302 and a speed change symbol 304 such that the first length is greater than the second length. Conversely, if the aircraft will need to undergo a speed increase, the processor 102 will command the display device 106 to render the travel direction symbol 302 and a speed change symbol 304 such that the first length is less than the second length. Moreover, and with reference back to FIG. 2, it is seen that the first and second vertices 312, 318 are rendered on the planned flight path 204, and the travel direction symbol 302 and the speed change symbol 304 both point in a direction in which the aircraft is, or will be, traveling on the planned flight path 204.

Figure 5:
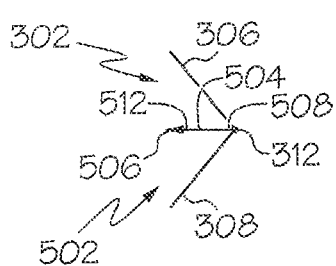
Figure 6:
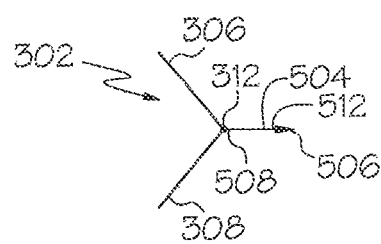

Turning now to FIGS. 5 and 6, it is seen that the acceleration point symbols 208-1, 208-2 comprise the travel direction symbol 302 and an acceleration symbol 502. The acceleration symbol 502 comprises a line 504 and an arrowhead 506. The line 504 has a first end 508, which is rendered on the first vertex 312, and a second end 512, which has the arrowhead 506 rendered thereon.

As FIGS. 5 and 6 depict, the line 504 and arrowhead 506 are rendered either in the direction of travel or opposite the direction of travel depending upon whether the processor 102 determines that the aircraft will need to undergo a negative acceleration (deceleration) or a positive acceleration. Specifically, if the aircraft will need to undergo a deceleration, the processor 102 will command the display device 106 to render the line 504 and arrowhead 506 in a direction opposite to the direction of travel of the aircraft. Conversely, if the aircraft will need to undergo an acceleration, the processor 102 will command the display device 106 to render the line and arrowhead in a direction of travel of the aircraft. Moreover, and with reference back to FIG. 2, it is seen that the first vertex 312 and the line 504 are rendered on the planned flight path 204, and the travel direction symbol 302 points in the direction in which the aircraft is, or will be, traveling on the planned flight path 204.

One exemplary method 700 that the system 102 implements for commanding the display device 106 to selectively render one or both speed change point symbols 206 and/or one or both acceleration point symbols 208 on the current flight path 204 is depicted in flowchart form in FIG. 7 and will now be described. Before doing so, it is noted that the parenthetical reference numerals used in describing the exemplary method refers to the like-numbered flowchart blocks. It will additionally be appreciated that, although the exemplary method 700 is depicted and described in an order of steps, this is merely exemplary of one particular embodiment and one or more of the steps may be performed simultaneously or in a different order than is explicitly depicted in the flowchart or described herein.

Figure 7:
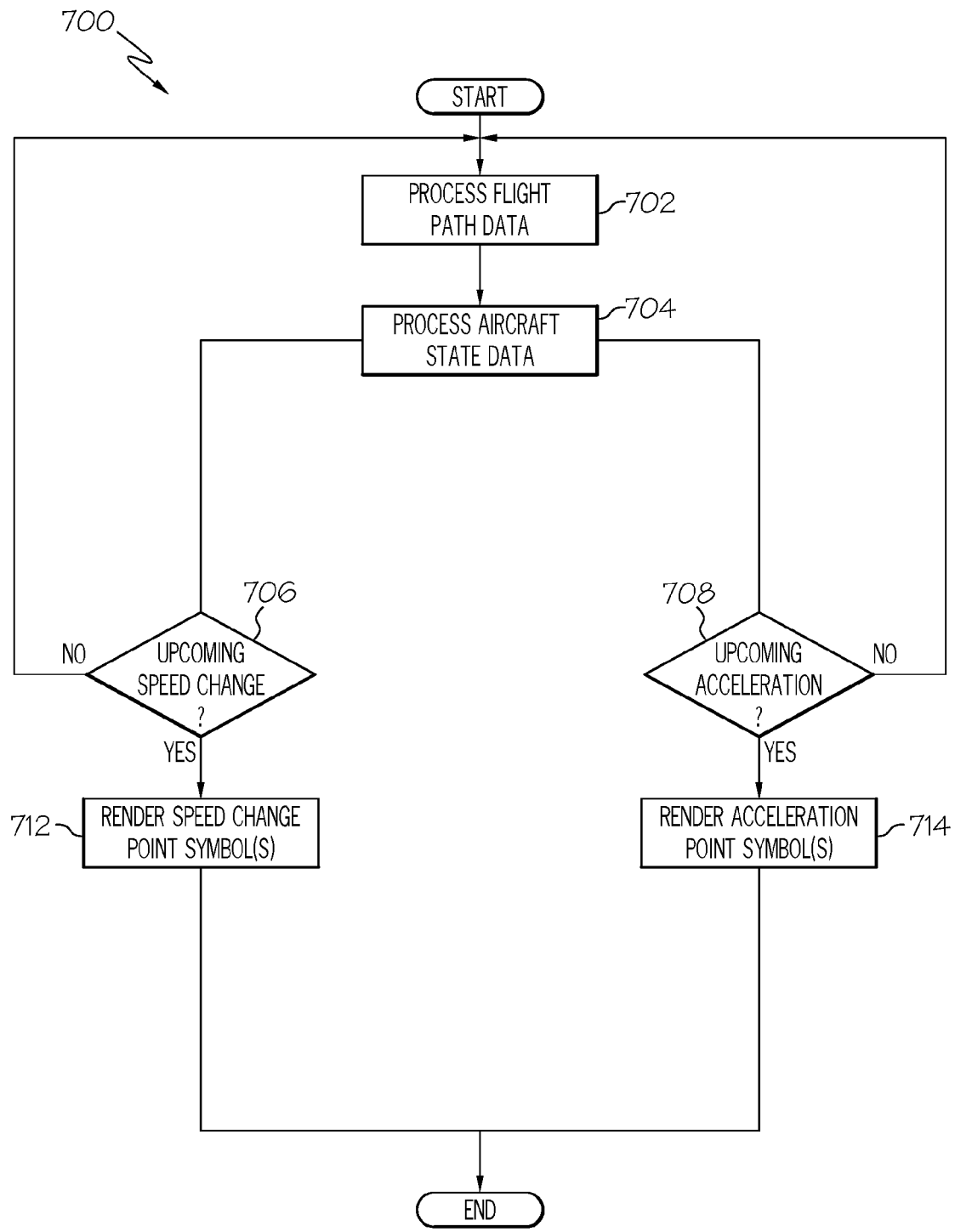
FIG. 7 an exemplary method, in flowchart form, that the system of FIG. 1 implements for selectively displaying one or more images and specific symbology on the display device of FIG. 1.

Referring now to FIG. 7, it is seen that the processor 102, receives and processes the flight path data supplied from the FMS 104-1 (702), and receives and processes the aircraft state data supplied from the one or more sensors 104-2 to determine the current state of the aircraft (704). More specifically, the processor 102, based on the aircraft state data it receives, determines at least the aircraft position, altitude, direction, and speed. The processor 102, based on the processed flight path data and aircraft state data, determines if the aircraft will need to undergo a speed change (706) and if the aircraft will need to undergo one of an acceleration or a deceleration (708).

If the processor 102 determines that the aircraft will need to undergo a speed change, the processor 102 will command the display device 106 to render one or more speed change point symbols 206 (712). Similarly, if the processor 102 determines that the aircraft will need to undergo a deceleration or an acceleration, the processor 102 will command the display device 106 to render one or more acceleration point symbols 208 (714).

In some embodiments, the processor 102 is configured to command the display device 106 to selectively render the speed change point symbols 206 and the acceleration point symbols 208 in different colors. More specifically, the processor 102 will command the display device 106 to render the symbols 206 in colors that depend upon whether the aircraft is being operated in manual mode or managed mode (e.g., autopilot engaged). In such embodiments, and with reference back to FIG. 1, the processor 102 is additionally coupled to receive a signal 112 that indicates whether aircraft managed mode is engaged or disengaged. If the managed mode is engaged, the processor 102 will command the display device 106 to render the symbols 206, 208 in a first color, and if the managed mode is disengaged, the processor 102 will command the display device 106 to render the symbols 206, 208 in a second color.

Figure 8:
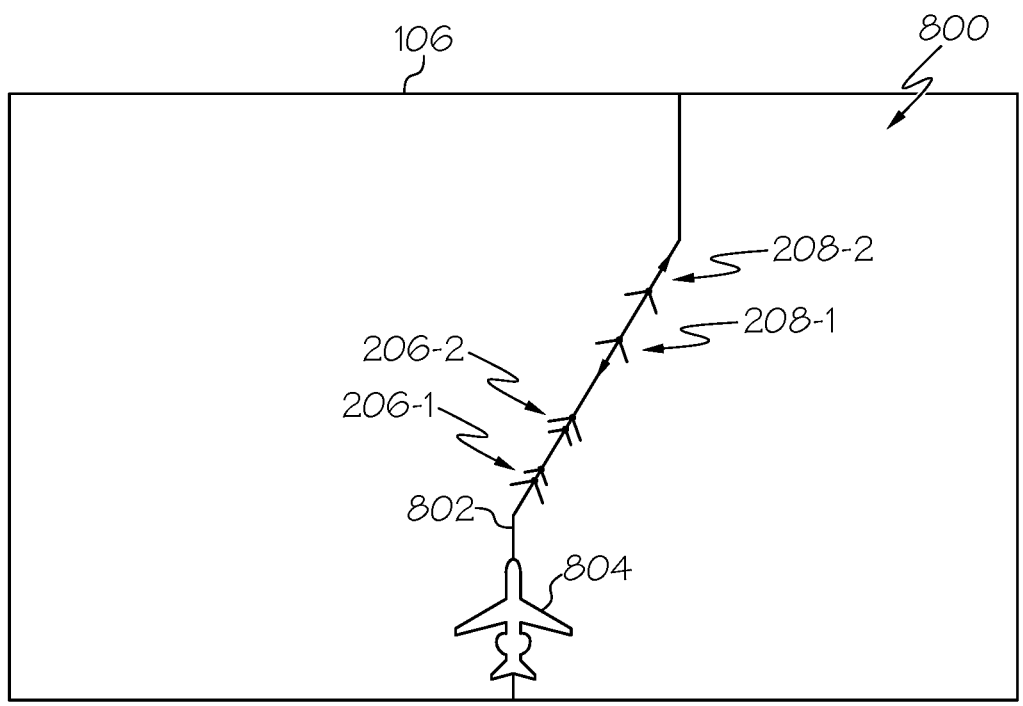
FIG. 8 is exemplary representation of another image that may rendered on a display device in the system of FIG. 1.

It is additionally noted that the processor 102 may instead or additionally command the display device 106 to render a lateral map. One embodiment of a lateral map 800 is depicted in FIG. 8, and includes the planned flight path rendered as a horizontal flight path 802. It additionally includes a top-down view aircraft symbol 804, the two speed change point symbols 206 (206-1, 206-2), and the two acceleration point symbols 208 (208-1, 208-2).

The system and method described herein provides unique and intuitive symbology that helps pilots build situation awareness regarding speed change trends, locations, and expected accelerations and decelerations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:
1. A vehicle display system, comprising:
 a display device; and
 a processor in operable communication with the display device and coupled to receive vehicle path data and vehicle state data, the vehicle path data representative of a planned path of the vehicle, the vehicle state data representative of current vehicle state, the processor configured, upon receipt of these data, to command the display device to (i) render at least a portion of the planned vehicle path and (ii) selectively render a speed change point symbol on the current vehicle path,
 wherein:
  the speed change point symbol comprises a travel direction symbol and a speed change symbol,
  the travel direction symbol comprises first and second lines that intersect at a first vertex, the first and second lines each having a first length, the first vertex rendered on the planned vehicle path, and
  the speed change symbol is rendered adjacent the travel direction symbol and comprises third and fourth lines that intersect at a second vertex, the third and fourth lines each having a second length that unequal to the first length, the second vertex rendered on the planned vehicle path.

2. The system of claim 1, wherein:
 the travel direction symbol and the speed change symbol both point in a direction in which the vehicle is, or will be, traveling on the planned vehicle path.

3. The system of claim 2, wherein the processor is further configured to:
 determine when the vehicle will need to undergo a speed change; and
 upon making this determination, command the display device to render the speed change point symbol.

4. The system of claim 3, wherein the processor is further configured to:
 determine when the vehicle will need to undergo a speed decrease or a speed increase;
 command the display device to render travel direction symbol and a speed change symbol such that the first length is greater than the second length when the vehicle will need to undergo a speed decrease; and
 command the display device to render the travel direction symbol and the speed change symbol such that the first length is less than the second length when the vehicle will need to undergo a speed increase.

5. The system of claim 1, wherein:
 the processor is further configured to selectively render an acceleration point symbol on the planned vehicle path;
 the acceleration point symbol comprises the travel direction symbol and an acceleration symbol,
 the acceleration symbol is rendered on the planned vehicle path and comprises a line and an arrowhead, the line having a first end and a second end, the first end rendered on the first vertex, the arrowhead rendered on the second end.

6. The system of claim 5, wherein the processor is further configured to:
 determine when the vehicle will need to undergo one of a deceleration or an acceleration; and
 upon making this determination, command the display device to render the acceleration point symbol.

7. The system of claim 6, wherein the processor is further configured to:
 command the display device to render the line and arrowhead in a direction opposite to a direction of travel of the vehicle when it is determined that the vehicle will need to undergo a deceleration; and command the display device to render the line and arrowhead in a direction of travel of the vehicle when it is determined that the vehicle will need to undergo an acceleration.

8. The system of claim 1, wherein:
the vehicle is an aircraft;
the processor is coupled to receive a signal that indicates whether aircraft managed mode is engaged or disengaged;
the processor is further configured to command the display device to (i) render the speed change point symbol in a first color when managed mode is engaged and (ii) render the speed change point symbol in a second color when managed mode is disengaged.

9. The system of claim 8, wherein:
the planned flight path is a vertical flight path; and
the processor commands the display device to render a vertical situation display.

10. The system of claim 8, wherein:
the planned vehicle path is a horizontal flight path; and
the processor commands the display device to render a lateral map.

11. A vehicle display system, comprising:
a display device; and
a processor in operable communication with the display device and coupled to receive vehicle path data and vehicle state data, the vehicle path data representative of a planned vehicle path of the vehicle, the vehicle state data representative of current vehicle state, the processor configured, upon receipt of these data, to command the display device to (i) render at least a portion of the planned vehicle path and (ii) selectively render an acceleration point symbol on the current vehicle path,
wherein:
the acceleration point symbol comprises a travel direction symbol and an acceleration symbol,
the travel direction symbol comprises first and second lines that intersect at a first vertex, the first and second lines each having a first length, the first vertex rendered on the planned vehicle path, and
the acceleration symbol is rendered on the planned vehicle path and comprises a line and an arrowhead, the line having a first end and a second end, the first end rendered on the first vertex, the arrowhead rendered on the second end.

12. The system of claim 11, wherein the processor is further configured to:
determine when the vehicle will need to undergo one of a deceleration or an acceleration; and
upon making this determination, command the display device to render the acceleration point symbol.

13. The system of claim 12, wherein the processor is further configured to:
command the display device to render the line and arrowhead in a direction opposite to a direction of travel of the vehicle when it is determined that the vehicle will need to undergo a deceleration; and
command the display device to render the line and arrowhead in a direction of travel of the vehicle when it is determined that the vehicle will need to undergo an acceleration.

14. The system of claim 11, wherein:
the processor is further configured to selectively render a speed change point symbol on the planned vehicle path;
the speed change point symbol comprises the travel direction symbol and a speed change symbol; and
the speed change symbol is rendered adjacent the travel direction symbol and comprises third and fourth lines that intersect at a second vertex, the third and fourth lines each having a second length that unequal to the first length, the second vertex rendered on the planned vehicle path.

15. The system of claim 14, wherein:
the travel direction symbol and the speed change symbol both point in a direction in which the vehicle is, or will be, traveling on the planned vehicle path.

16. The system of claim 15, wherein the processor is further configured to:
determine when the vehicle will need to undergo a speed change; and
upon making this determination, command the display device to render the speed change point symbol.

17. The system of claim 16, wherein the processor is further configured to:
determine when the vehicle will need to undergo a speed decrease or a speed increase;
command the display device to render travel direction symbol and a speed change symbol such that the first length is greater than the second length when the vehicle will need to undergo a speed decrease; and
command the display device to render the travel direction symbol and the speed change symbol such that the first length is less than the second length when the vehicle will need to undergo a speed increase.

18. The system of claim 11, wherein:
the vehicle is an aircraft;
the processor is coupled to receive a signal that indicates whether aircraft managed mode is engaged or disengaged;
the processor is further configured to command the display device to (i) render the acceleration point symbol in a first color when managed mode is engaged and (ii) render the acceleration symbol point symbol in a second color when managed mode is disengaged.

19. The system of claim 18, wherein:
the planned vehicle path is a vertical flight path; and
the processor commands the display device to render a vertical situation display.

20. The system of claim 18, wherein:
the planned vehicle path is a horizontal flight path; and
the processor commands the display device to render a lateral map.

* * * * *